US007401212B2

(12) United States Patent
Miller et al.

(10) Patent No.: US 7,401,212 B2
(45) Date of Patent: Jul. 15, 2008

(54) SELF-CONTAINED COMPUTER SERVICING DEVICE

(75) Inventors: Wesley G. Miller, Austin, TX (US); Mark Myers, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 10/978,625

(22) Filed: Nov. 1, 2004

(65) Prior Publication Data

US 2006/0107119 A1    May 18, 2006

(51) Int. Cl.
G06F 15/177 (2006.01)
G06F 9/445 (2006.01)

(52) U.S. Cl. ............................... 713/1; 713/2; 713/100; 714/2; 714/25; 714/46

(58) Field of Classification Search ............. 713/1–100; 726/24; 714/2, 25, 46
See application file for complete search history.

(56) References Cited

U.S. PATENT DOCUMENTS

| 6,128,734 | A  | * | 10/2000 | Gross et al. ............... 713/100 |
| 6,272,629 | B1 | * | 8/2001  | Stewart .......................... 713/2 |
| 6,279,109 | B1 |   | 8/2001  | Brundridge |
| 6,314,455 | B1 | * | 11/2001 | Cromer et al. ............. 709/217 |
| 6,715,067 | B1 | * | 3/2004  | Rhoads et al. ................ 713/1 |
| 6,763,456 | B1 | * | 7/2004  | Agnihotri et al. ............ 713/2 |
| 6,944,867 | B2 | * | 9/2005  | Cheston et al. ............. 719/327 |
| 6,948,099 | B1 | * | 9/2005  | Tallam .......................... 714/38 |
| 6,976,058 | B1 |   | 12/2005 | Brown et al. |
| 7,114,018 | B1 | * | 9/2006  | Maity et al. ................... 710/72 |
| 2004/0158699 | A1 | * | 8/2004 | Rhoads et al. ................ 713/1 |
| 2005/0081079 | A1 | * | 4/2005 | Cheston et al. ............... 714/2 |
| 2005/0138399 | A1 | * | 6/2005 | Cheston et al. ............. 713/189 |
| 2006/0047942 | A1 | * | 3/2006 | Rothman et al. ............. 713/2 |
| 2006/0075276 | A1 | * | 4/2006 | Kataria et al. ................ 714/4 |

FOREIGN PATENT DOCUMENTS

EP    0817014 A2   1/1998
EP    1491983 A1   12/2004

OTHER PUBLICATIONS

Unknown, "Windows Preinstallation Environment Overview", Jun. 30, 2004, 7 pages, http://www.microsoft.com/whdc/system/winpreinst/WindowsPE_over.mspx, U.S.A.
Unknown, "Recommendations for Booting Windows from USB Storage Devices", Aug. 23, 2004, 5 pages, http://www.microsoft.com/whdc/device/storage/usb-boot.mspx, U.S.A.

(Continued)

Primary Examiner—Nitin C Patel
(74) Attorney, Agent, or Firm—Senniger Powers LLP

(57) ABSTRACT

Servicing a computer using a self-contained computer servicing device. The device includes a memory storing an operating system. The device includes a first interface for connecting the device to the computer and a second interface for connecting the device to a network. A driver for the second interface is also stored in the memory. The device accesses a bootable image of an operating system of the computer on the network via the second interface or stored on the memory. The device boots the computer by executing the operating system stored in the memory of the device and services operations of the computer according to the bootable image.

26 Claims, 3 Drawing Sheets

OTHER PUBLICATIONS

Unknown, "Petit MP3 Player Boots PCs into Linux," LinuxDevices.com, 4 pages, Oct. 14, 2004, http://linuxdevices.com/news/NS4097060580.html, U.S.A.

Unknown, "Embedded Linux Distribution Boots From USB Thumb Drive", 4 pages, Dec. 12, 2003, http://linuxdevices.com/news/NS6805529669.html, U.S.A.

Unknown, "SHINUX", Oct. 19, 2004, http://shinux.org, France, translated by Google at http://216.239.39.104/translate_c?hl=en&u=http://shinux.org.

Unknown, "NetDisk: Network Direct Attached Storage", unknown, 2004, 2 pages, http://www.ximeta.com/files/nd_datasheet_us.pdf, U.S.A.

Wolf, "Is there hope in home NAS?," Mar. 1, 2004, 2 pages http://www.nwfusion.com/net.worker/columnists/2004/0301wolf.html, U.S.A.

Brian, "CES 2004 Coverage II", Jan. 22, 2004, 8 pages, http://www.thetechlounge.com/article.php?directory=ces_2004_part_2&page=6, U.S.A.

* cited by examiner

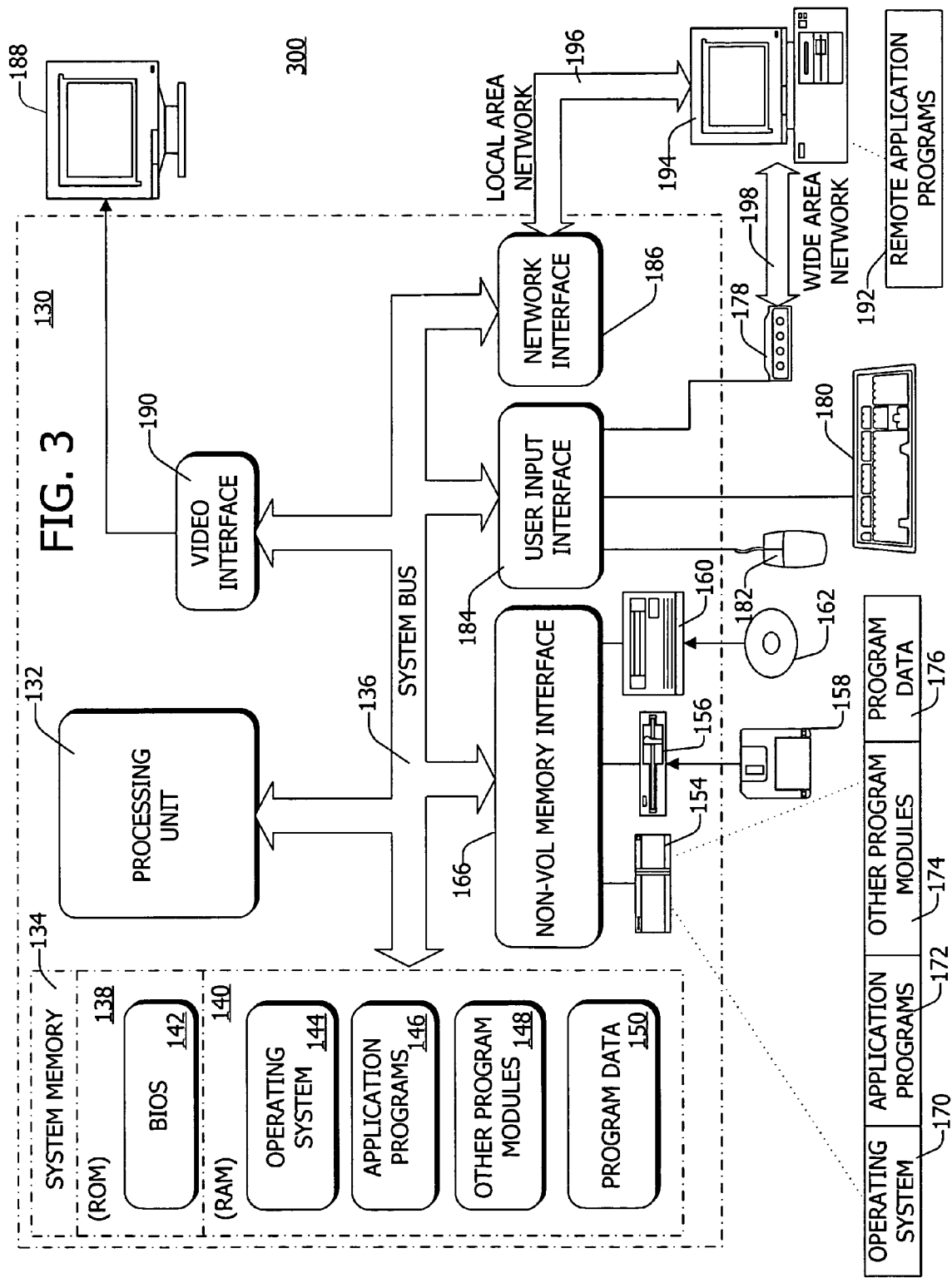

SELF-CONTAINED COMPUTER SERVICING DEVICE

TECHNICAL FIELD

Embodiments of the present invention relate generally to the field of operating system servicing. In particular, embodiments of this invention relate to servicing operations of a computer using a bootable device having a built-in operating system and network connectivity.

BACKGROUND OF THE INVENTION

A personal computer (PC) is a convenient tool to enhance and facilitate a user's experience with other technological advances, such as the Internet, word processing, or the like. Like many devices, a PC may occasionally experience a failure of operations of its operating system or may require periodic updates, upgrades, or the like. Unfortunately, this PC failure, commonly known as a crash, may be caused by software designed to disrupt operations of the operating system. For example, computer viruses, worms, adware, spyware, and the like are designed to disrupt and/or corrupt functions of the operating system.

A missing driver for a particular piece of hardware may also cause a PC's operating system to crash. For example, in order to use a particular device, such as a multi-function printer, a software driver must be installed to enable the PC to work with the printer. Absent such software driver, the multi-function printer will likely be unusable and the operating system of the PC may crash.

Another type of operating system crash may result from some of the PC's hardware being inaccessible (e.g., the hard drive, the memory, or the like).

In the event of a crash, the user frequently resorts to using an external device to service, including restore or repair, the operating system. For example, in a case of recovery or repair for a stand-alone PC, the user (e.g., a PC technician) usually runs a recovery CD-ROM disk in the PC's CD-ROM drive. The basic input and output system (BIOS) of the PC will assist the user in booting the PC from the CD-ROM drive to restore or repair the crashed operating system in the PC.

In another example, in a case of recovery or repair of a PC for which a bootable image of the PC is desirable, a network administrator or PC technician needs to access the bootable image of the operating system of the PC before recovering or repairing the PC. Occasionally, the bootable image is stored on a network, and the user not only needs to boot the PC from the CD-ROM drive but must also install a suitable driver for a network adapter installed in the PC. However, the network administrator may not have the suitable driver for the network adapter readily available and, thus, the PC recovery and/or repair cannot be completed until such driver is found.

Presently, some memory devices, including Universal Serial Bus (USB) flash memory drives and the like, provide relatively fast access to a PC. However, these devices lack a functional operating system to boot the PC. Common practices, such as booting from the CD-ROM drive, are reliable, but the CD-ROM drive has a relatively slow connection to the PC and lacks network connectivity for connecting the PC to a network Accordingly, a self-contained computer servicing device is desired to address at least one or more of these and other disadvantages by servicing a computer from a device containing a functional operating system and providing network connectivity.

SUMMARY OF THE INVENTION

Embodiments of the present invention comprise a device including a wired or a wireless connection to, for example, a computer that requires servicing. The device in one embodiment also contains a memory, such as a flash hard disk or other non-volatile memory, which stores a functional operating system, independent of other devices, and contains device drivers for network adapters. In addition, this embodiment permits access to a bootable image of the operating system for recovery or other services of the crashed computer via the network adapter. As such, the computer boots from the device and its operations are serviced.

Additionally, embodiments of the invention comprise a device using a common computer interface, such as a USB connection or the like, to connect to a computer that provides relatively fast and reliable access to the operating system stored in the memory of the device. As such, the device provides a very compact tool for servicing, including deployment, recovery, repair, trouble-shooting, updating, or other functions or services to a computer. Embodiments of the invention permit original equipment manufacturers (OEM's), independent hardware vendors (IHV's), independent software vendors (ISV's), and/or information technology professionals to efficiently service the operating systems of computers without knowing the hardware/software configurations of each individual computer.

Advantageously, aspects of the invention involve a device that includes all functionality necessary to service (e.g., deploy, recover, or repair, or the like) a computer, regardless of the hardware or operating system installed on the computer. The device in this embodiment includes a self-contained boot device, operating environment, and networking device. The computer boots from the device by executing the operating system stored in its memory and operating a built-in networking module to access a bootable image on a network to service a damaged operating system of the computer.

In accordance with one aspect, a method services operations of a computer. An operation servicing device is connected to the computer via a first interface. The operation servicing device comprises a memory. The memory of the operation servicing device has an operating system stored therein. The operating system stored in the memory of the operation servicing device is executed to boot the computer when the operation servicing device is connected to the computer. The operation servicing device is connected to a network via a second interface. The memory of the operation servicing device also stores a driver for the second interface. A bootable image of the operations of the computer on the network is accessed via the second interface. The operations of the computer are serviced according to the bootable image.

In accordance with another aspect, an apparatus services operations in a computer. A means for connecting connects the apparatus to the computer. A means for storing stores an operating system, wherein the operating system boots the computer. A means for connecting connects the apparatus to a network to access a bootable image of the operations of the computer. The means of storing also stores a driver for the means for connecting to connect the apparatus to the network, wherein the operations of the computer are serviced according to the bootable image.

According to yet another aspect of the invention, a device services operations in a computer. A memory stores an operating system, wherein the operating system boots the computer. A computing interface connects the device to the computer. A network interface connects the device to a network to access a bootable image of the operations of the computer.

The memory also stores a driver for the network interface. The operations of the computer are serviced according to the bootable image.

According to a further aspect of the invention, a computer-readable medium has computer-executable components for servicing operations of a computer. An operating system component stored in a memory of an operation servicing device connects to the computer via a first interface. The operating system component is responsive to a user selection to execute the operating system stored in the memory of the operation servicing device to boot the computer. A network driver component stored in the memory of the operation servicing device is associated with a second interface. The operation servicing device is connected to a network via the second interface. A bootable image component representative of the operations of the computer is accessed on the network via the second interface for servicing operations of the computer.

According to yet another aspect, a system services operations in a computer. The system includes a network and an operation servicing device. The operation servicing device comprises a first interface for connecting the operation servicing device to the computer. A memory stores an operating system, and the operating system boots the computer. A second interface connects the operation servicing device to the network to access a bootable image of the operations of the computer. The memory also stores a driver for the second interface, wherein the operations of the computer are serviced according to the bootable image.

Alternatively, the invention may comprise various other methods and apparatuses.

Other features will be in part apparent and in part pointed out hereinafter.

BRIEF DESCRIPTION OF THE DRAWINGS

FIG. 3 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
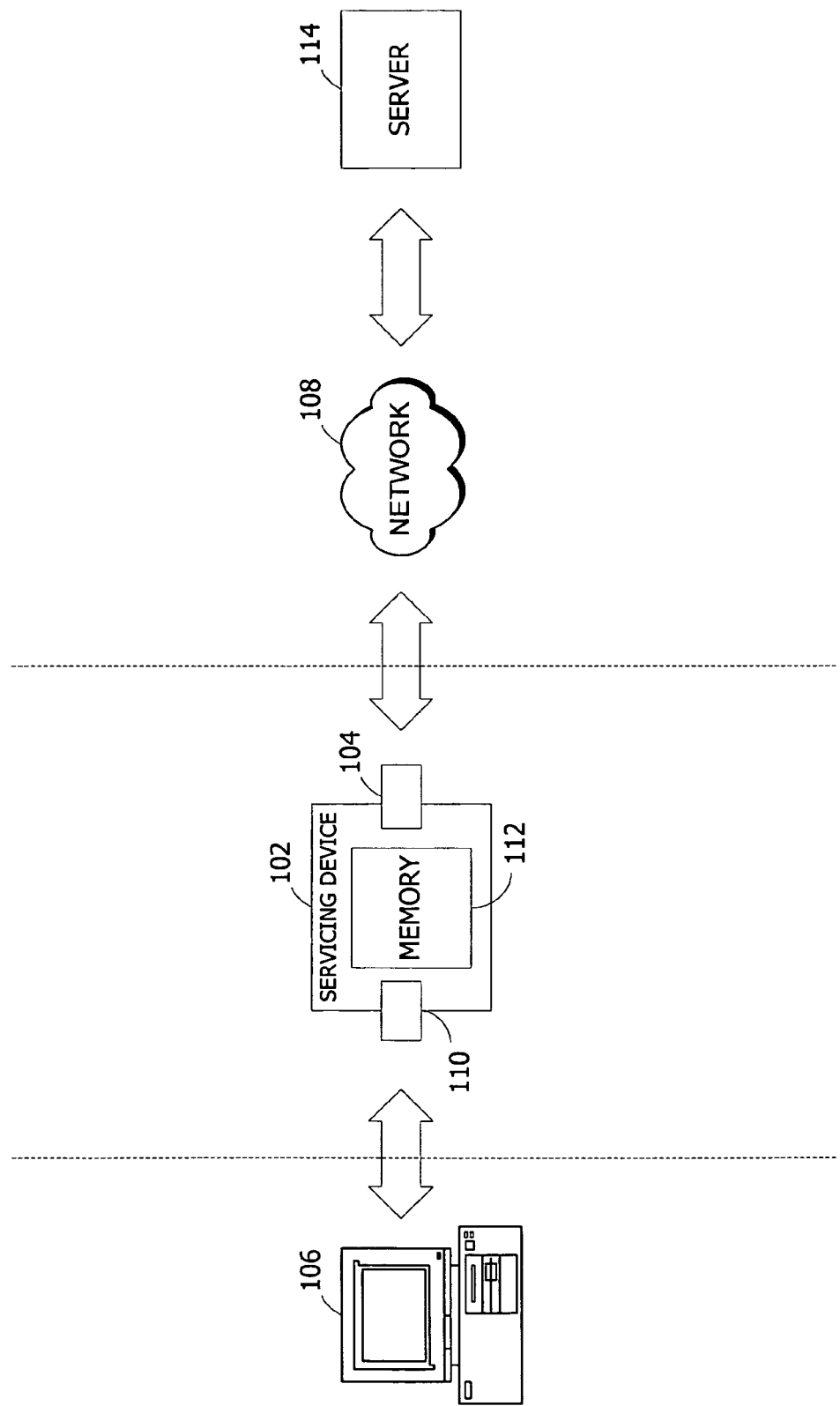
FIG. 1 is an exemplary block diagram illustrating a self-contained computer servicing device according to one embodiment of the invention.

Referring first to FIG. 1, an exemplary block diagram illustrates a self-contained computer servicing device 102 according to one embodiment of the invention. The servicing device 102 includes a first interface 110, a second interface 104, and a memory 112. The servicing device 102 may be used to perform services, including deployment, recovery, repair, replace, trouble-shooting, maintaining, updating, and/or other services or functions to service operations of a computer 106. It is to be understood that the servicing device 102 may be used by OEMs, IHVs, ISVs, BIOS vendors, information technology managers/technicians/administrators, or other hardware/software manufacturers during various stages of servicing/manufacturing of a computer. The first interface 110 may be an interface configured to connect the servicing device 102 to a computer 106. For example, the first interface 110 may be a bootable system bus, 1394 port, Universal Serial Bus (USB) port, or other bus or parallel system that connects or couples the servicing device 102 to the computer 106. The computer 106 may be any computing device having components including a processing unit, a memory, an input/output interface, an operating system, and the like. In one embodiment, the computer 106 comprises a computer 130 as shown in FIG. 3.

The memory 112 of the servicing device 102 may be a memory capable of storing data, or it may be other non-volatile memory (see, for example, system memory 134 in FIG. 3). The memory 112 stores an operating system (e.g., operating system 170 as shown in FIG. 3) configured to boot the computer 106. The operating system may be any piece of software, program, or code that controls the allocation and usage of hardware resources, such as the memory 112, a central processing unit (CPU) time, disk space, and peripheral devices. In addition, the operating system stored in the memory 112 may be different from an operating system of the computer 106. In one embodiment, the memory 112 stores other software, program, application, software security patches, updates, or code to assist in servicing the operations of the computer 106. In another embodiment, the memory 112 also stores a bootable image of an operating system for replacing the operating system of the computer 106. For example, a bootable image may be a complete operating system, a functional operating system, a recovery operating system, file structures and systems, user settings, and/or other configurations, or the like for servicing (e.g., repairing, restoring, or replacing) the operating system of the computer 106.

Initially, the computer 106 may be a computer incapable of properly starting or booting on its own due to a crash of its operating system or a computer requiring updated security patches or other updates. In other words, the operating system of the computer 106 is unable to adequately control and use the hardware resources of the computer 106, such as a hard drive, a memory, and/or other input/output devices, such that a user may not be able to use the computer 106 as desired or to recover data or operations contained on the computer 106. A computer technician, network administrator, or the like connects the servicing device 102 to the computer 106 via the first interface 110. It is to be understood that upon connecting the servicing device 102 to the computer 106, the computer 106 recognizes the first interface 110 and prepares the first interface 110 for use by the computer 106. In one embodiment, the basic input and output system (BIOS) of the computer 106 prompts the administrator and/or technician whether to boot from the servicing device 102 or to boot from other devices. In another embodiment, the technician may be required to configure the BIOS to boot the servicing device 102 as the primary boot device for the computer 106.

Once the servicing device 102 is connected to the computer 106, the computer 106 executes the operating system stored in the memory 112. As such, the operating system stored in the memory 112 boots the computer 106.

In one embodiment, the computer 106 is one of many computers that requires servicing, including repair or restoration of operating systems. For example, the computer 106 may be a networked computer or one of many computers in a factory of an original equipment manufacture (OEM) of computers. When servicing (e.g., repairing, restoring, updating, deploying, replacing, or the like) operations of the computer 106, it may be time-consuming and laborious for the network administrator to manually and individually service the computer 106 to the same or default configuration, such as file system or the like. As such, the bootable image of the operations of the computer 106 may be stored on a network such that the network administrator does not need to remember the default or other configurations when servicing the computer 106.

Under the current practice, the network administrator is required to use the network connectivity in the computer 106, if any, to connect the computer 106 to a network to access the bootable image. Unfortunately, the network administrator frequently finds the booting operating system or the recovery/repair disk does not contain the specific driver for the network adapter of the computer 106. Advantageously, the servicing device 102 overcomes these shortcomings by including the second interface 104 to enable the computer 106 to connect to a network 108. In addition, the memory 112 stores a device driver for the second interface 104. Hence, once the computer 106 is booted by using the operating system stored in the memory 112, the booted computer 106 can use the second interface 104 of the servicing device 102 to access the network 108. The interface 104 may be a network adapter that connects the servicing device 102 to the network 108 via a wired or wireless connection.

Next, the operating system of the servicing device 102 accesses the bootable image, which may be stored in a server 114, via the second interface 104. By accessing the bootable image, the computer 106 is serviced.

In one embodiment, by using the second interface 104 of the servicing device 102, the network administrator does not need to rely on searching for the appropriate device driver for the network adapter of the computer 106 to access the bootable image on the network. In addition, the servicing device 102 eliminates the reliance on knowing the hardware configuration of the computer 106 before servicing operations of the computer 106. In other words, with the servicing device 102, the network administrator has all the functional and adequate tools s/he needs to service the operating system of the computer 106.

In yet another embodiment, the servicing device 102 can be used to remove software that is stored locally on the computer 106, access diagnostic software that is stored on the computer 106 or on the network 108, and/or access a part of the bootable image on the network 108.

In other words, when connecting the servicing device 102 to the computer 106 via the first interface 110, the computer 106 recognizes or treats the servicing device 102 as another multifunctional device—a device having the memory 112 and the second interface 104. As such, after being booted from the servicing device 102, the computer 106 can access the memory 112 the second interface 104. Also, because the memory 112 stores the device driver for the second interface 104, the computer 106 need not search for the device driver in its memory to use the second interface 104.

In operation, for example, after the computer 106 crashes, a network administrator connects the servicing device 102 to the computer via the first interface 110. The computer 106 uses the operating system stored in the memory 112 to boot the computer 106. The computer 106 also uses the second interface 104 of the servicing device 102 to connect to the network 108 to access the bootable image stored in the server 114. As a result, the network administrator services the operations of the computer 106 according to the bootable image.

In one embodiment, the memory 112 also stores a bootable image (e.g., an operating system image) of the operating system of computer 106 for servicing the computer 106. For example, the servicing device 102 contains in its memory 112 a full operating system image capable of replacing the failed operating system on computer 106. In this instance, the technician boots the computer 106 using servicing device 102 and prepares the hard drive or storage media in the computer 106 for acceptance of the full replacement operating system stored in the memory 112 of the servicing device 106. Upon completion of the operating system replacement, computer 106 is able to boot the newly replaced operating system and the user is back to a working state prior to the service of the computer 106.

Figure 2:
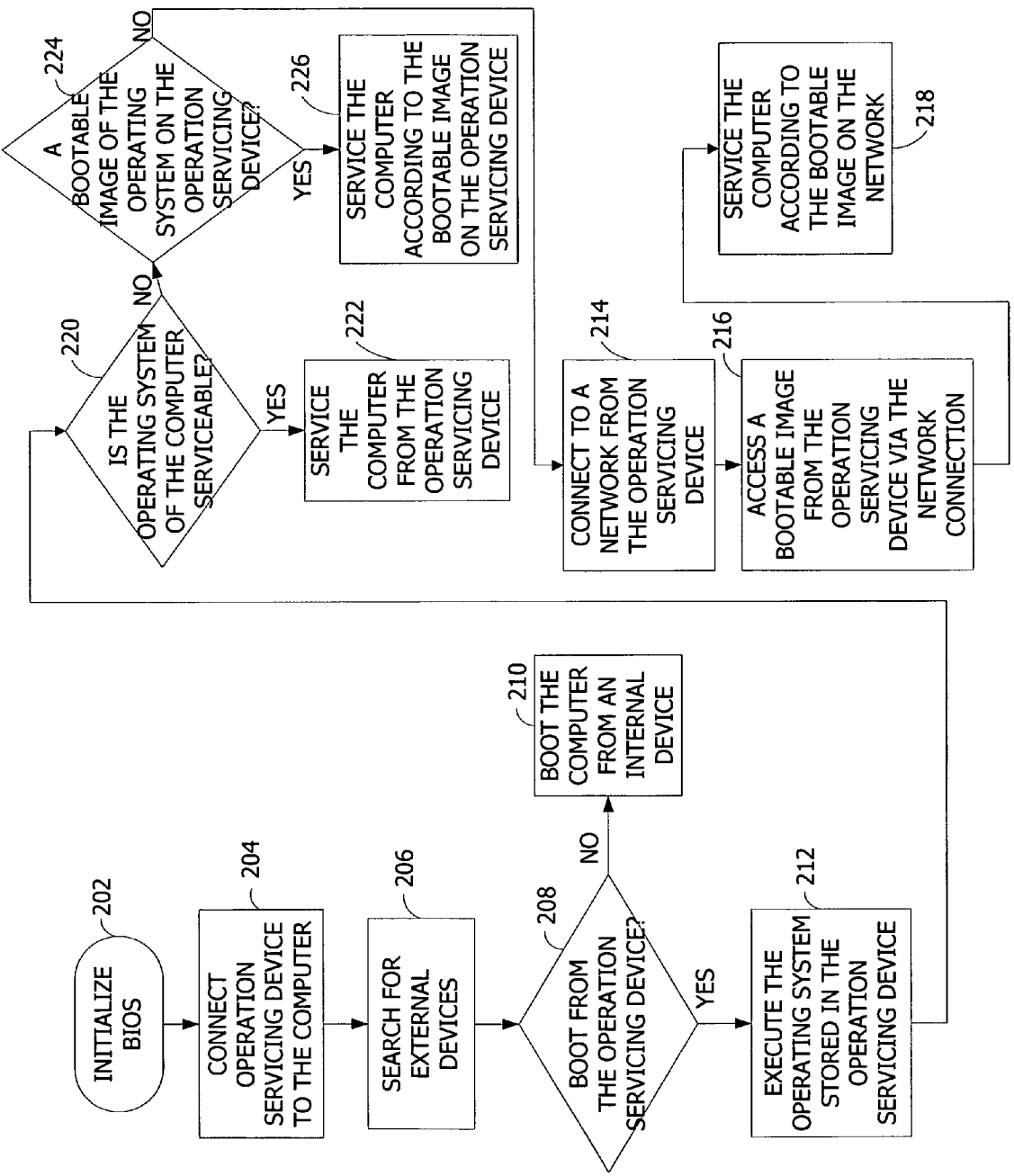
FIG. 2 is an exemplary flow chart illustrating a method for servicing a computer according to one embodiment of the invention.

FIG. 2 is a flow chart illustrating an exemplary method for servicing a computer according to one embodiment of the invention. Initially, for example, the computer is unable to properly boot or start operation on its own due to a crash of the operating system of the computer or is in need of service. At 202, the computer initializes the BIOS, that is, the computer attempts to recognize various hardware devices or apparatus connected to the computer. At 204, a network administrator or a computer technician connects the operation servicing device to the computer via a first interface. The computer searches for various external devices at 206 and determines whether to boot the computer from the operation servicing device at 208. In one embodiment, the computer may prompt the network administrator or the computer technician to select which external device may be used to boot the computer. In another embodiment, the computer may boot from the operation servicing device according to a set of predefined BIOS settings on the computer itself, or via a script setting on the operation servicing device. If the computer or the network administrator determines not to boot from the operation servicing device, the computer boots from an internal device or hardware, such as a hard drive at 210. Alternatively, if the computer or the network administrator determines to boot from the operation servicing device, the computer executes the operating system stored in the memory of the operation servicing device at 212.

In one embodiment, the administrator/technician determines whether the operating system of the computer (e.g., computer 106) is serviceable at 220. For example, after the operating system of the computer crashes, the operation servicing device is used to service/repair the crashed operating system. If the technician/administrator determines that the operating system of the computer is serviceable, the administrator/technician uses the operating system in the operation servicing device to service the computer at 222. If, on the other hand, the operating system of the computer is not serviceable, a replacement operating system is desirable. As discussed above, the servicing device 102 may also contain a bootable image (e.g., a full operating system of the operating system of the computer) in the memory 112. As such, the administrator/technician determines whether a replacement operating system image is available on the operation servicing device at 224. If the determination is positive, the computer is serviced according to the bootable image stored in the operation servicing device at 226.

If the determination is negative, the computer connects to a network via a second interface of the operation servicing device at 214. The memory of the operation servicing device stores a driver for the second interface. At 216, the computer, via the second interface of the operation servicing device, accesses a bootable image of the operations of the computer. As such, the computer at 218 is serviced.

FIG. 3 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 3 illustrates operating system 144, application programs 146, other program modules 148, and program data 150.

The computer 130 may also include other removable/non-removable, volatile/nonvolatile computer storage media. For example, FIG. 3 illustrates a hard disk drive 154 that reads from or writes to non-removable, nonvolatile magnetic media. FIG. 3 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 3, provide storage of computer readable instructions, data structures, program modules and other data for the computer 130. In FIG. 4, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, biometrics devices and/or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, 1394 or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 3 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user interface 184 or other appropriate mechanism. Alternatively, the modem 178 may be connected to system bus 136 through a network interface or directly to an ISA or comparable bus. In a networked environment, program modules depicted relative to computer 130, or portions thereof, may be stored in a remote memory storage device (not shown). By way of example, and not limitation, FIG. 3 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, digital cameras, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above apparatuses and methods without departing from the scope of the invention, it is intended that all matter contained in the above description and shown in the accompanying drawings shall be interpreted as illustrative and not in a limiting sense.

What is claimed is:

1. A method for servicing operations of a computer, said computer having an operating system and a local network interface associated therewith, said operating system being unable to boot on its own, said method comprising:

connecting an operation servicing device to the computer via a first interface of the operation servicing device, said operation servicing device comprising a memory, said memory of the operation servicing device having another operating system stored therein, said operation servicing device being external with respect to the computer, said another operating system being capable of booting the computer, said first interface comprising a universal serial bus (USB) interface;

in response to an instruction to start servicing the computer from an administrator at a location of the computer, executing the operating system stored in the memory of the operation servicing device when the operation servicing device is connected to the computer to boot the computer;

connecting the operation servicing device to a network via a second interface of the operation servicing device, said second interface comprising a network interface adapter, said memory of the operation servicing device having a driver for the second interface stored therein, said driver being a network adapter driver, said second interface being an integral part of the operation servicing device and being external to the computer;

accessing a bootable image of the operations of the computer on the network via the second interface and not via the local network interface of the computer, said bootable image being capable of serving the operating system of the computer; and servicing operations of the operating system of the computer according to the bootable image, said servicing operations including updating the operations of the operating system of the computer according to the bootable image.

2. The method of claim 1 further comprising preparing the first interface for use by the computer.

3. The method of claim 1 wherein updating the operations of the computer comprises at least one of the following: recovering the operations of the computer according to the bootable image or repairing the operations of the computer according to the bootable image.

4. The method of claim 1 wherein the bootable image is an image of the operating system of the computer.

5. The method of claim 1 wherein accessing comprises accessing a bootable image of the operations of the computer stored in the memory and wherein servicing comprises servicing the operations of the computer according to the bootable image stored in the memory.

6. An apparatus for servicing operations in a computer, said computer including a local network interface, comprising:

means for connecting the apparatus to the computer, said apparatus being external with respect to the computer, said means for connecting comprising a universal serial bus (USB) interface;

means for storing an operating system, wherein the operating system boots the computer; and means for connecting the apparatus to a network to access a bootable image representing the operations of the computer, said means for connecting the apparatus to the network comprising a network interface adapter, said means for storing also stores a driver for the means for connecting the apparatus to the network, said driver being a network adapter driver, said means for connecting the apparatus to the network being an integral part of the apparatus and being external to the computer, wherein the operations of the computer are serviced according to the bootable image accessed via the means for connecting the apparatus to the network and not via the local network interface of the computer in response to an instruction to start the service operations from an administrator at a location of the computer.

7. The apparatus of claim 6 wherein the means for connecting the apparatus to the computer is prepared for use by the computer.

8. The apparatus of claim 6 wherein the bootable image is an image of the operating system of the computer.

9. The apparatus of claim 6 wherein the servicing includes at least one of the following: repairing or recovering.

10. The apparatus of claim 6 wherein the means for storing further stores the bootable image and wherein the operations of the computer are serviced according to the bootable image stored in the means for storing.

11. A device for servicing operations in a computer, said computer having an operating system and a local network interface associated therewith, said operating system being unable to boot on its own, comprising:

a memory for storing an operating system, wherein the operating system is capable of booting the computer;

a universal serial bus ("USB") computing interface for connecting the device to the computer, said device being external with respect to the computer; and a network interface, and not the local network interface of the computer, for connecting the device to a network to access a bootable image of another operating system for servicing the operating system of the computer, said network interface being an integral part of the device and being external to the computer, wherein the memory stores a driver for the network interface, said driver being a network interface driver for the network interface, and wherein the operating system of the computer is serviced according to the bootable image of the another operating system in response to an instruction to start the service from an administrator at the computer, said instruction also indicative of booting the computer using the operating system stored on the memory.

12. The device of claim 11 wherein the computing interface is prepared for use by the computer.

13. The device of claim 11 wherein the network interface comprises a network adapter.

14. The device of claim 11 wherein servicing includes at least one of the following: repairing or recovering.

15. The device of claim 11 wherein the bootable image is an image of the operating system of the computer.

16. The device of claim 11 wherein the memory further stores the bootable image and wherein the operations of the computer are serviced according to the bootable image stored in the memory.

17. A computer-readable storage medium having computer-executable components for servicing operations of a computer, said computer having a local network interface, said computer-readable storage medium comprising:

an operating system component stored in a memory of an operation servicing device, said operation servicing device being connected to the computer via a first interface of the operation servicing device, said first interface comprising a universal serial bus (USB) interface, said operating system component being responsive to a user selection at a location of the computer to execute the operating system stored in the memory of the operation servicing device to boot the computer, said operation servicing device being external with respect to the computer;

a network driver component stored in the memory of the operation servicing device; said network driver component being associated with a second interface of the operation servicing device, said second interface comprising a network interface adapter, said network driver component including a network adapter driver for the second interface, said operation servicing device being connected to a network via the second interface and not via the local network interface of the computer, said second interface being an integral part of the operation servicing device; and a bootable image component representative of the operations of the computer, said bootable image component being accessible on the network via the second interface for servicing operations of the computer.

18. The computer-readable storage medium of claim 17 wherein the operating system component comprises computer-executable instructions for preparing the first interface of the operation servicing device for use by the computer.

19. The computer-readable storage medium of claim 17 wherein the bootable image is an image of the operating system of the computer.

20. The computer-readable storage medium of claim 17 wherein servicing includes at least one of the following: repairing or recovering.

21. The computer-readable storage medium of claim 17 wherein the bootable image is stored in the memory for servicing the operations of the computer.

22. A system for servicing operations in a computer, said computer including a local network interface, said system comprising:
- a network; and
- an operation servicing device for servicing operations of the computer in response to an instruction to start servicing from an administrator at a location of the computer, said operation servicing device, being external with respect to the computer, comprising:
- a first interface of the operation servicing device for connecting the operation servicing device to the computer, said first interface comprising a universal serial bus (USB) interface;
- a memory for storing an operating system, said operating system booting the computer, and
- a second interface driver, and not the local network interface of the computer, of the operation servicing device for connecting the operation servicing device to the network to access a bootable image representing the operations of the computer, said second interface comprising a network interface adapter, said memory storing a driver for the second interface, said second interface being an integral part of the operation servicing device and being external to the computer, wherein the operations of the computer are serviced according to the bootable image.

23. The system of claim 22 wherein the first interface is prepared for use by the computer.

24. The system of claim 22 wherein the operation servicing device for servicing operations of the computer is configured for at least one of the following: repairing or recovering the operations of the computer.

25. The system of claim 22 wherein the bootable image is an image of the operating system of the computer.

26. The system of claim 22 wherein the memory further stores the bootable image and wherein the operations of the computer are serviced according to the bootable image stored in the memory.

* * * * *